(12) United States Patent
Kashima (10) Patent No.: US 9,645,455 B2
(45) Date of Patent: May 9, 2017

(54) LIQUID CRYSTAL DISPLAY PANEL, DRIVING METHOD AND FABRICATION METHOD THEREOF, AND DISPLAY DEVICE

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 333 days.

(21) Appl. No.: 14/236,171

(22) PCT Filed: Dec. 4, 2013

(86) PCT No.: PCT/CN2013/088552
§ 371 (c)(1),
(2) Date: Jan. 30, 2014

(87) PCT Pub. No.: WO2014/190705
PCT Pub. Date: Dec. 4, 2014

(65) Prior Publication Data
US 2015/0212358 A1    Jul. 30, 2015

(30) Foreign Application Priority Data

May 30, 2013    (CN) .......................... 2013 1 0209384

(51) Int. Cl.
G02F 1/1343    (2006.01)
G02F 1/1337    (2006.01)
(Continued)

(52) U.S. Cl.
CPC ........ *G02F 1/13439* (2013.01); *G02F 1/1334* (2013.01); *G02F 1/1337* (2013.01);
(Continued)

(58) Field of Classification Search
CPC ... G02F 1/134363; G02F 2001/134372; G02F 2001/134381; G02F 2001/133742;
(Continued)

(56) References Cited

U.S. PATENT DOCUMENTS

2010/0171903 A1* 7/2010 Okuyama ............ G02B 6/0041
                                                        349/65
2011/0261306 A1* 10/2011 Tsai ...................... G02F 1/1334
                                                       349/117
(Continued)

FOREIGN PATENT DOCUMENTS

CN        101464585 A    10/2012
CN        102707482 A    10/2012
(Continued)

OTHER PUBLICATIONS

International Preliminary Report on Patentability issued Dec. 1, 2015; PCT/CN2013/088552.
(Continued)

*Primary Examiner* — Nathanael R Briggs
*Assistant Examiner* — Alexander Gross
(74) *Attorney, Agent, or Firm* — Ladas & Parry LLP (57)    ABSTRACT

A liquid crystal display panel, a driving method and a fabrication method thereof, and a display device are disclosed. The liquid crystal display panel includes first and second substrates and a PDLC layer therebetween. The PDLC layer is formed by a positive liquid crystal and a polymer matrix, and the positive liquid crystal is initialized to be perpendicular to the substrates. The liquid crystal display panel further includes: a first transparent electrode unit, disposed on the first substrate and connected with a switch element; a second transparent electrode unit, disposed on the second substrate and connected with a first voltage; a third transparent electrode unit, disposed on the
(Continued)

first and second substrates. The third transparent electrode unit includes a plurality of third transparent electrodes, each of which has a preset height and connected with a second voltage with a polarity opposite to that of the first voltage.

11 Claims, 2 Drawing Sheets

(51) Int. Cl.
  *G02F 1/1334* (2006.01)
  *G02F 1/133* (2006.01)
(52) U.S. Cl.
  CPC ...... *G02F 1/1343* (2013.01); *G02F 1/134309* (2013.01); *G02F 1/13306* (2013.01); *G02F 1/134363* (2013.01); *G02F 2001/13345* (2013.01); *G02F 2001/13347* (2013.01); *G02F 2001/133742* (2013.01); *G02F 2001/134372* (2013.01); *G02F 2001/134381* (2013.01)
(58) Field of Classification Search
  CPC ......... G02F 1/1334; G02F 2001/13345; G02F 2001/13347
  See application file for complete search history.

(56) References Cited

U.S. PATENT DOCUMENTS

| 2012/0069283 A1* | 3/2012 | Kizu | G02F 1/133707 349/141 |
| 2012/0133878 A1* | 5/2012 | Hirakata | G02F 1/133528 349/141 |
| 2015/0029437 A1* | 1/2015 | Sakai | G02F 1/133634 349/61 |

FOREIGN PATENT DOCUMENTS

| CN | 102929045 A | 2/2013 |
| CN | 103278976 A | 9/2013 |

OTHER PUBLICATIONS

First Chinese Office Action Appln. No. 201310209384.3; Dated Mar. 26, 2015.
International Search Report mailed Mar. 13, 2014; PCT/CN2013/088552.

\* cited by examiner

FIG. 1

– – – – – Electric field direction

LIQUID CRYSTAL DISPLAY PANEL, DRIVING METHOD AND FABRICATION METHOD THEREOF, AND DISPLAY DEVICE

TECHNICAL FIELD

Embodiments of the invention relate to a liquid crystal display panel, a driving method and a fabrication method thereof, and a display device.

BACKGROUND

Polymer dispersed liquid crystal (PDLC) may be used for forming a liquid crystal layer of a Liquid Crystal Display (LCD) to serve as a display medium. The PDLC has the characteristics of controlling light transmission by light scattering intensity without employing a polarizing plate. Generally, the PDLC comprises liquid crystal molecules and a polymer matrix. The optical characteristics of the PDLC layer mainly depend on an effective refractive index of the liquid crystal molecules and a matching degree of the liquid crystal molecules with the polymer matrix.

An ordinary PDLC layer is generally fabricated with a positive liquid crystal. When no voltage is applied, the liquid crystal molecules in the ordinary PDLC layer are in a random state, light is refracted and reflected for many times on the interface of the liquid crystal molecules and the polymer matrix after it enters into the ordinary PDLC layer, and in this case, the ordinary PDLC layer presents a milky scattering state. When a voltage is applied, the liquid crystal molecules in the ordinary PDLC layer are arranged along the direction of the electric field, the light is not refracted or reflected after it enters into the ordinary PDLC layer, and in this case, the light is transmitted directly.

A trans-PDLC layer is generally fabricated with a negative liquid crystal. When no voltage is applied, the liquid crystal molecules in the trans-PDLC layer are arranged perpendicular to a substrate of the liquid crystal display, and the light is not refracted or reflected after it enters into the trans-PDLC layer, and in this case, the light is transmitted directly. When a voltage is applied, the liquid crystal molecules in the trans-PDLC layer are arranged in a direction perpendicular to the electric field, the light is refracted and reflected for many times on the interface of the liquid crystal molecules and the polymer matrix after it enters into the trans-PDLC layer, and in this case, the trans-PDLC layer presents the milky scattering state.

The characteristics of the liquid crystal molecules per se have a great influence on the optical properties of the PDLC layer. Due to a certain defect of the physical property of the negative liquid crystal, the trans-PDLC layer fabricated with the negative liquid crystal possesses the disadvantages of high driving voltage, low contrast ratio and the like.

SUMMARY

According to an aspect of the invention, a liquid crystal display panel is provided. The liquid crystal display panel comprises a first substrate and a second substrate opposite to each other, and a polymer dispersed liquid crystal (PDLC) layer disposed between the first substrate and the second substrate. The PDLC layer is formed by polymerizing a positive liquid crystal and a polymer matrix, and the positive liquid crystal is initialized to be perpendicular to the substrates. The liquid crystal display panel further comprises: a first transparent electrode unit, disposed on a surface of the first substrate facing the second substrate and connected with a switch element; a second transparent electrode unit, disposed on a surface of the second substrate facing the first substrate and connected with a first voltage; and a third transparent electrode unit, disposed on the first substrate and the second substrate, the third transparent electrode unit comprises a plurality of third transparent electrodes, each of the third transparent electrodes has a preset height and is connected with a second voltage, the second voltage has a polarity opposite to that of the first voltage, and the third transparent electrode unit is insulated from the first transparent electrode unit and the second transparent electrode unit.

For example, the first transparent electrode unit comprises a plurality of first transparent electrodes arranged on the first substrate at intervals, and the second transparent electrode unit comprises a plurality of second transparent electrodes arranged on the second substrate at intervals.

For example, the second transparent electrodes and the first transparent electrodes are arranged opposite to each other one by one.

For example, the third transparent electrode unit comprises the plurality of third transparent electrodes disposed on the first substrate and the second substrate in an alternate manner, each third transparent electrode on the first substrate is disposed between adjacent first transparent electrodes, and each third transparent electrode on the second substrate is disposed between adjacent second transparent electrodes.

For example, the third transparent electrodes disposed on the first substrate and the third transparent electrodes disposed on the second substrate are not opposite to each other.

For example, each of the third transparent electrodes is higher than each of the first transparent electrodes and each of the second transparent electrodes.

For example, the height of each third transparent electrode is of ½D<h<D, where D is a thickness of the PDLC layer, and h is the height of each third transparent electrode.

For example, the third transparent electrode is of cylinder-shape, hill-shape or wedge-shape.

For example, the liquid crystal display panel further comprises: a first alignment layer disposed between the PDLC layer and the first transparent electrode unit; a second alignment layer disposed between the PDLC layer and the second transparent electrode unit.

According to another aspect of the invention, a display device is provided. The display device comprises a liquid crystal display panel as described above.

According still another aspect of the invention, a driving method of a liquid crystal display panel as described above is provided. The method comprises: when the liquid crystal display panel is powered on, the second transparent electrode unit is applied with the first voltage, the third transparent electrode unit is applied with the second voltage with the polarity opposite to that of the first voltage, the first transparent electrode unit is controlled by the switch element to have a polarity same as that of the first voltage, so that the first transparent electrode unit and the second transparent electrode unit have the polarity opposite to that of the third transparent electrode unit.

According yet another aspect of the invention, a fabrication method of a liquid crystal display panel is provided. The method comprises: forming a first transparent electrode unit connected with a switch element on a first substrate; forming a second transparent electrode unit connected with a first voltage on a second substrate; forming a third transparent electrode unit connected with a second voltage on a surface of the first substrate where the first transparent electrode unit is disposed and on a surface of the second substrate where the second transparent electrode unit is disposed, wherein the third transparent electrode unit comprises a plurality of third transparent electrodes, each of the third transparent electrodes has a preset height, the third transparent electrode unit is insulated from the first transparent electrode unit and the second transparent electrode unit, and the second voltage has a polarity opposite to that of the first voltage; arranging the surface of the first substrate where the first transparent electrode unit is disposed to be opposite to the surface of the second substrate where the second transparent electrode unit is disposed; and filling a PDLC layer formed by polymerizing a positive liquid crystal and a polymer matrix between the first substrate and the second substrate, and initializing the PDLC layer so that the positive liquid crystal is arranged perpendicular to the substrates.

For example, the forming a first transparent electrode unit connected with a switch element on a first substrate and forming a second transparent electrode unit connected with a first voltage on a second substrate comprise: forming a plurality of first transparent electrodes arranged on the first substrate at intervals, and forming a plurality of second transparent electrodes arranged on the second substrate at intervals.

For example, the second transparent electrodes and the first transparent electrodes are arranged opposite to each other one by one.

For example, the forming a third transparent electrode unit connected with the second voltage on the first substrate and on the second substrate comprises: forming the plurality of third transparent electrodes on the first substrate and the second substrate in an alternate manner, disposing each third transparent electrode on the first substrate between adjacent first transparent electrodes, and disposing each third transparent electrode on the second substrate between adjacent second transparent electrodes.

For example, the third transparent electrodes disposed on the first substrate and the third transparent electrodes disposed on the second substrate are not opposite to each other.

For example, the forming the plurality of third transparent electrodes on the first substrate and the second substrate in an alternate manner comprises: forming the third transparent electrodes by overlapping a plurality of transparent conductive layers with a printing process, or forming the third transparent electrodes by firstly forming transparent insulation structures with a transparent insulation material and then coating a transparent conductive layer on the transparent insulation structures.

For example, the initializing the PDLC layer so that the positive liquid crystal is arranged perpendicular to the substrate comprises: during forming the PDLC layer, the second transparent electrode unit is applied with the first voltage and the first transparent electrode unit is controlled by the switch element to have a polarity opposite to that of the second transparent electrode unit, so that an electric field perpendicular to the substrates is formed between the first transparent electrode unit and the second transparent electrode unit and liquid crystal molecules of the PDLC layer are arranged perpendicular to the substrates, and at the same time, the PDLC layer is cured; or after forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form a first alignment layer of vertical alignment and a second alignment layer of vertical alignment.

For example, the initializing the PDLC layer so that the positive liquid crystal is arranged perpendicular to the substrate comprises: during forming the PDLC layer, the second transparent electrode unit is applied with the first voltage and the first transparent electrode unit is controlled by the switch element to have a polarity opposite to that of the second transparent electrode unit, so that an electric field perpendicular to the substrates is formed between the first transparent electrode unit and the second transparent electrode unit and liquid crystal molecules of the PDLC layer are arranged perpendicular to the substrates, and at the same time, the PDLC layer is cured; and after forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form a first alignment layer of vertical alignment and a second alignment layer of vertical alignment.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 3 is a schematic view illustrating a state in which the liquid crystal display panel according to the embodiment of the invention is powered on.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The embodiments of the invention provide a liquid crystal display panel, a driving method and a fabrication method thereof, and a display device, which can reduce the driving voltage of a trans-PDLC layer and enhance the contrast ratio of the trans-PDLC layer.

An embodiment of the invention provides a liquid crystal display panel. The liquid crystal display panel comprises a first substrate and a second substrate opposite to each other, and a PDLC layer disposed between the first substrate and the second substrate. The PDLC layer is formed by polymerizing a positive liquid crystal and a polymer matrix. The liquid crystal display panel further comprises: a first transparent electrode unit, disposed on a surface of the first substrate facing the second substrate and connected with a switch element; a second transparent electrode unit, disposed on a surface of the second substrate facing the first substrate and connected with a first voltage; and a third transparent electrode unit, disposed on the first substrate and the second substrate. The third transparent electrode unit comprises a plurality of third transparent electrodes, and each of the third transparent electrodes has a preset height and connected with a second voltage. The second voltage has a polarity opposite to that of the first voltage. The third transparent electrode unit is insulated from the first transparent electrode unit and the second transparent electrode unit.

When the liquid crystal display panel is powered on, the first voltage is applied to the second transparent electrode unit, the second voltage with the polarity opposite to that of the first voltage is applied to the third transparent electrode unit, the switch element controls the first transparent electrode unit to have a polarity same as that of the first voltage, so that the first transparent electrode unit and the second transparent electrode unit have the polarity opposite to that of the third transparent electrode unit. At this time, the directions of the electric field are relatively disordered and the liquid crystal molecules are arranged along the directions of the electric field, and thus the liquid crystal molecules of the PDLC layer are in a random state. When the liquid crystal display panel is powered off, because the PDLC layer has undergone an initialization process, the liquid crystal molecules of the PDLC layer are arranged perpendicular to the substrates of the liquid crystal display panel. The initialization process for the PDLC layer will be described below in detail.

In one example, the liquid crystal display panel further comprises: a first alignment layer disposed between the PDLC layer and the first transparent electrode unit, and a second alignment layer disposed between the PDLC layer and the second transparent electrode unit. Both the first alignment layer and the second alignment layer are of vertical alignment.

In one example, the first transparent electrode unit comprises a plurality of first transparent electrodes arranged on the first substrate at intervals, and the second transparent electrode unit comprises a plurality of second transparent electrodes arranged on the second substrate at intervals. For example, the second transparent electrodes and the first transparent electrodes are arranged opposite to each other one by one. If the first transparent electrodes and the second transparent electrodes are not arranged opposite to each other one by one, the initialization process for the PDLC layer will be affected somewhat, which will result in an insufficient transmittance when the panel is powered off, and thereby the contrast ratio is reduced.

In one example, the third transparent electrode unit comprises the plurality of third transparent electrodes having the preset height. The height of each third transparent electrode is of $\frac{1}{2}D<h<D$, where D is a thickness of the PDLC layer and h is the height of each of the third transparent electrodes. The third transparent electrodes may be disposed on the first substrate, may be disposed on the second substrate, or may be disposed on both of the first substrate and the second substrate. Preferably, in order to optimize the distribution of the electric field, the third transparent electrodes are disposed on the first substrate and the second substrate in an alternate manner, i.e., among the third transparent electrodes in a same row, the third transparent electrodes in odd columns are disposed on the first substrate and the third transparent electrodes in even columns are disposed on the second substrate. That is, the third transparent electrodes on the first substrate and the third transparent electrodes on the second substrate are not arranged opposite to each other. Each third transparent electrode on the first substrate is disposed between adjacent first transparent electrodes, and each third transparent electrode on the second substrate is disposed between adjacent second transparent electrodes. If the third transparent electrodes are merely disposed on one of the first and second substrates, compared with the case that the third transparent electrodes are disposed on both of the first and second substrates, the directions of the electric field when the liquid crystal display panel is powered on will not be disordered sufficiently, the disorder degree of the liquid crystal molecules is not high enough so that the scattering degree is decreased.

For example, the switch element is a Thin Film transistor (TFT).

It should be noted that, each of the third transparent electrodes having the preset height means that the height of each third transparent electrode is greater than those of the first transparent electrode and the second transparent electrode. In this way, the third transparent electrodes form a disordered electric field with the first transparent electrodes and the second transparent electrodes. It should be noted that, the embodiments of the invention have no requirements on the height of the first transparent electrodes or the height of the second transparent electrodes.

It should be noted that, the heights of the plurality of third transparent electrodes may be different from one another as long as they are greater than those of the first transparent electrodes and the second transparent electrodes. Preferably, the plurality of third transparent electrodes have the same height, at least the third transparent electrodes on the first substrate have the same height and the third transparent electrodes on the second substrate have the same height, so that the fabrication process can be simplified.

In one example, the third transparent electrodes may be of cylinder-shape, hill-shape or wedge-shape. The hill-shape refers to a shape in which a middle portion is higher than end portions on both sides of the middle portion. During forming the third transparent electrodes, the third transparent electrodes may be formed by overlapping a plurality of transparent conductive layers with a printing process, or the third transparent electrodes may be formed by firstly forming transparent insulation structures with a transparent insulation material (such as, a resin) and then coating a transparent conductive layer on the transparent insulation structures.

When the liquid crystal display panel according to the embodiment of the invention is powered off, the first transparent electrode unit, the second transparent electrode unit and the third transparent electrode unit are all not applied with voltages, the liquid crystal molecules are arranged perpendicular to the substrates, light is not refracted or reflected after it enters into the PDLC layer, and in this case, the light is transmitted directly.

When the liquid crystal display panel according to the embodiment of the invention is powered on, the second transparent electrode unit is applied with the first voltage, the third transparent electrode unit is applied with the second voltage with the polarity opposite to that of the first voltage, the first transparent electrode unit is controlled by the switch element to have the polarity same as that of the first voltage, so that the first transparent electrode unit and the second transparent electrode unit have the polarity opposite to that of the third transparent electrode unit. At this time, the directions of the electric field are relatively disordered and the liquid crystal molecules are arranged along the directions of the electric field, and thus the liquid crystal molecules of the PDLC layer are in a random state. Accordingly, the light is refracted and reflected on the interface of the liquid crystal molecules and the polymer matrix after it enters into the PDLC layer and the PDLC layer presents a milky scattering state.

In the liquid crystal display panel according to the embodiment of the invention, a trans-PDLC layer can be obtained with the positive liquid crystal by designing and arranging the first transparent electrode unit, the second transparent electrode unit and the third transparent electrode unit. Because the physical property of the positive liquid crystal is superior to that of the negative liquid crystal, compared with the case that the trans-PDLC layer is fabricated with the negative liquid crystal in the conventional technology, the liquid crystal display panel according to the embodiment of the invention can reduce the driving voltage of the trans-PDLC layer, enhance the contrast ratio of the trans-PDLC layer and greatly improve electro-optical property of the trans-PDLC layer.

An embodiment of the invention provides a display device, comprising the above-described liquid crystal display panel. The structure and operation principle of the liquid crystal display panel are the same as those described above, and will not be described repeatedly herein. In addition, the structures of other parts of the display device may be similar to those in the related art and will not be described in detail herein. For example, the display device may be an electronic paper, an Organic Light Emitting Diode (OLED) display panel, a liquid crystal television, a liquid crystal display, a digital photo frame, a mobile phone, a tablet computer, or any other products or components having a display function.

An embodiment of the invention provides a driving method of the above-described liquid crystal display panel, comprising: when the liquid crystal display panel is powered on, the second transparent electrode unit is applied with the first voltage, the third transparent electrode unit is applied with the second voltage with the polarity opposite to that of the first voltage, the first transparent electrode unit is controlled by the switch element to have the polarity same as that of the first voltage, so that the first transparent electrode unit and the second transparent electrode unit have the polarity opposite to that of the third transparent electrode unit.

An embodiment of the invention provides a fabrication method of a liquid crystal display panel. The method comprises: forming a first transparent electrode unit connected with a switch element on a first substrate; forming a second transparent electrode unit connected with a first voltage on a second substrate; forming a third transparent electrode unit connected with a second voltage on a surface of the first substrate where the first transparent electrode unit is disposed and on a surface of the second substrate where the second transparent electrode unit is disposed, wherein the third transparent electrode unit comprises a plurality of third transparent electrodes, each of the third transparent electrodes has a preset height, the third transparent electrode unit is insulated from the first transparent electrode unit and the second transparent electrode unit, and the second voltage has a polarity opposite to that of the first voltage; arranging the surface of the first substrate where the first transparent electrode unit is disposed to be opposite to the surface of the second substrate where the second transparent electrode unit is disposed; and filling a PDLC layer formed by polymerizing a positive liquid crystal and a polymer matrix between the first substrate and the second substrate, and initializing the PDLC layer so that the positive liquid crystal is arranged perpendicular to the substrates.

In order to initialize the PDLC layer, an initialization process may be carried out in several manners as below.

(1) During forming the PDLC layer, the second transparent electrode unit is applied with the first voltage and the first transparent electrode unit is controlled by the switch element to have the polarity opposite to that of the second transparent electrode unit, so that an electric field perpendicular to the substrates is formed between the first transparent electrode unit and the second transparent electrode unit and the liquid crystal molecules of the PDLC layer are arranged perpendicular to the substrates, and at the same time, the PDLC layer is cured. In this way, even if the liquid crystal panel is powered off, the liquid crystal molecules of the PDLC layer can be arranged perpendicular to the substrates.

(2) After forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form a first alignment layer of vertical alignment and a second alignment layer of vertical alignment. Due to the first and second alignment layers of vertical alignment, the liquid crystal molecules of the PDLC layer are arranged perpendicular to the substrates. For example, the alignment material is liquid polyimide.

(3) After forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form the first alignment layer of vertical alignment and the second alignment layer of vertical alignment. Due to the first and second alignment layers of vertical alignment, the liquid crystal molecules of the PDLC layer are arranged perpendicular to the substrates. Meanwhile, during forming the PDLC layer, the second transparent electrode unit is applied with the first voltage and the first transparent electrode unit is controlled by the switch element to have the polarity opposite to that of the second transparent electrode unit, so that the electric field perpendicular to the substrates is formed between the first transparent electrode unit and the second transparent electrode unit and the liquid crystal molecules of the PDLC layer are arranged perpendicular to the substrates, and at the same time, the PDLC layer is cured. In this way, even if the liquid crystal panel is powered off, the liquid crystal molecules of the PDLC layer can be arranged perpendicular to the substrates.

Among the above three manners, the third manner has the best effect for it is a combination of the first and second manners.

In one example, the steps of forming the first transparent electrode unit connected with the switch element on the first substrate and forming the second transparent electrode unit connected with the first voltage on the second substrate comprises: forming a plurality of first transparent electrodes arranged on the first substrate at intervals, and forming a plurality of second transparent electrodes arranged on the second substrate at intervals. For example, the second transparent electrodes and the first transparent electrodes are arranged opposite to each other one by one.

In one example, the third transparent electrode unit comprises the plurality of third transparent electrodes having the preset height. The height of each third transparent electrode is of $\frac{1}{2}D < h < D$, where D is a thickness of the PDLC layer and h is the height of each third transparent electrode. The third transparent electrodes may be disposed on the first substrate, may be disposed on the second substrate, or may be disposed on both of the first substrate and the second substrate. Preferably, in order to optimize the distribution of the electric field, the third transparent electrodes are disposed on the first substrate and the second substrate in an alternate manner, i.e., among the third transparent electrodes in a same row, the third transparent electrodes in odd columns are disposed on the first substrate and the third transparent electrodes in even columns are disposed on the second substrate. That is, the third transparent electrodes on the first substrate and the third transparent electrodes on the second substrate are not arranged opposite to each other. Each third transparent electrode on the first substrate is disposed between adjacent first transparent electrodes, and each third transparent electrode on the second substrate is disposed between adjacent second transparent electrodes.

Therefore, the step of forming the third transparent electrode unit connected with the second voltage comprises: forming the plurality of third transparent electrodes disposed on the first substrate and the second substrate in the alternate manner, so that each third transparent electrode on the first substrate is disposed between adjacent first transparent electrodes and each third transparent electrode on the second substrate is disposed between adjacent second transparent electrodes.

In one example, the third transparent electrodes may be of cylinder-shape, hill-shape or wedge-shape. During forming the third transparent electrodes, the third transparent electrodes may be formed by overlapping a plurality of transparent conductive layers with a printing process, or the third transparent electrodes may be formed by firstly forming transparent insulation structures with a transparent insulation material (such as, a resin) and then coating a transparent conductive layer on the transparent insulation structures.

For example, the first transparent electrodes and the second transparent electrodes may be fabricated with a transparent conductive material such as Indium Tin Oxides (ITO) and the like.

When the liquid crystal display panel fabricated with the method according to the embodiment of the invention is powered off, the first transparent electrode unit, the second transparent electrode unit and the third transparent electrode unit are all not applied with voltages, the liquid crystal molecules are arranged perpendicular to the substrates, light is not refracted or reflected after it enters into the PDLC layer, and in this case, the light is transmitted directly.

When the liquid crystal display panel fabricated by the method according to the embodiment of the invention is powered on, the second transparent electrode unit is applied with the first voltage, the third transparent electrode unit is applied with the second voltage with the polarity opposite to that of the first voltage, the first transparent electrode unit is controlled by the switch element to have the polarity same as that of the first voltage, so that the first transparent electrode unit and the second transparent electrode unit have the polarity opposite to that of the third transparent electrode unit. At this time, the directions of the electric field are relatively disordered and the liquid crystal molecules are arranged along the directions of the electric field, and thus the liquid crystal molecules of the PDLC layer are in a random state. Accordingly, the light is refracted and reflected on the interface of the liquid crystal molecules and the polymer matrix after it enters into the PDLC layer and the PDLC layer presents the milky scattering state.

In the liquid crystal display panel fabricated with the method according to the embodiment of the invention, a trans-PDLC layer can be obtained with the positive liquid crystal by designing and arranging the first transparent electrode unit, the second transparent electrode unit and the third transparent electrode unit. Because the physical property of the positive liquid crystal is superior to that of the negative liquid crystal, compared with the case that the trans-PDLC layer is fabricated with the negative liquid crystal in the conventional technology, the liquid crystal display panel fabricated with the method according to the embodiment of the invention can reduce the driving voltage of the trans-PDLC layer, enhance the contrast ratio of the trans-PDLC layer and greatly improve electro-optical property of the trans-PDLC layer.

Hereinafter, the structure and operation principle of the liquid crystal display panel according to the embodiment of the invention will be described in detail in conjunction with the accompanying drawings.

Figure 1:
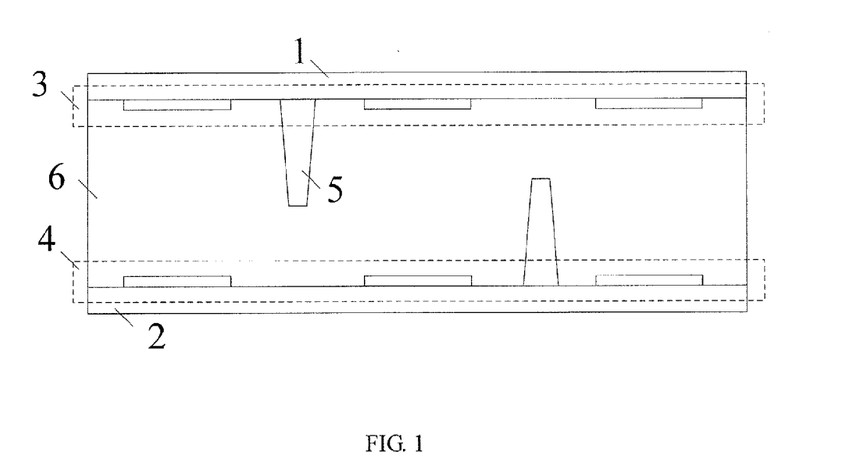
FIG. 1 is a schematic view illustrating a liquid crystal display panel according to an embodiment of the invention.

As shown in FIG. 1, the liquid crystal display panel according to the embodiment of the invention comprises a first substrate 2 and a second substrate 1 opposite to each other, and a PDLC layer 6 disposed between the first substrate 2 and the second substrate 1. On the first substrate 2, a first transparent electrode unit 4 connected with a switch element and a third transparent electrode 5 connected with a second voltage are disposed. For example, the switch element is a TFT. The first transparent electrode unit 4 comprises a plurality of first transparent electrodes arranged at intervals. The third transparent electrode 5 is disposed between adjacent first transparent electrodes. On the second substrate 1, a second transparent electrode unit 3 connected with a first voltage and the third transparent electrode 5 connected with the second voltage are disposed. The second transparent electrode unit 3 comprises a plurality of second transparent electrodes arranged at intervals. The third transparent electrode 5 is disposed between adjacent second transparent electrodes. For example, the first transparent electrodes and the second transparent electrodes are arranged opposite to each other one by one. For example, the third transparent electrode 5 on the first substrate 2 and the third transparent electrode 5 on the second substrate 1 are disposed in an alternate manner, so as to form a relatively uniform electric field. The third transparent electrode 5 on the first substrate 2 and the third transparent electrode 5 on the second substrate 1 may be called collectively as a third transparent electrode unit.

The third transparent electrode 5 has a preset height. For example, the height of the third transparent electrode 5 is less than the thickness of the PDLC layer but greater than half of the thickness of the PDLC layer. The third transparent electrode 5 may be of cylinder-shape, hill-shape or wedge-shape. During forming the third transparent electrode 5, the third transparent electrode 5 may be formed by overlapping a plurality of transparent conductive layers with a printing process, or the third transparent electrode 5 may be formed by firstly forming transparent insulation structures with a transparent insulation material (such as, a resin) and then coating a transparent conductive layer on the transparent insulation structures.

For example, the liquid crystal display panel further comprises: a first alignment layer (not shown) disposed between the PDLC layer 6 and the first transparent electrode unit 4, and a second alignment layer (not shown) disposed between the PDLC layer 6 and the second transparent electrode unit 3. Both the first alignment layer and the second alignment layer are of vertical alignment.

Figure 2:
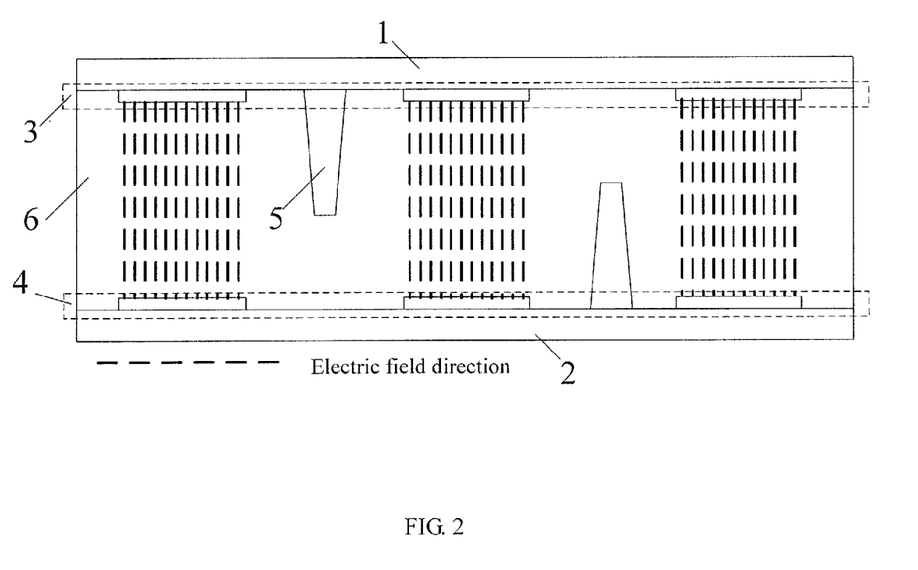
FIG. 2 is a schematic view illustrating an electric field for initializing a PDLC layer in the liquid crystal display panel according to the embodiment of the invention.

The PDLC layer 6 is formed by a positive liquid crystal and a polymer matrix. As shown in FIG. 2, during initialization of the PDLC layer, voltages are applied on the first transparent electrode unit 4 and the second transparent electrode unit 3. The voltage applied on the second transparent electrode unit 3 is the first voltage, and the voltage with a polarity opposite to that of the first voltage is applied to the first transparent electrode unit 4 by controlling the switch element, and thereby an electric field perpendicular to the substrates is formed between the first transparent electrode unit 4 and the second transparent electrode unit 3. Due to the existence of the electric field, the positive liquid crystal molecules in the PDLC layer are arranged along the direction of the electric field so as to be perpendicular to the substrates. Meanwhile, the PDLC layer is cured, and thus the initialization of the PDLC layer is completed. After the initialization of the PDLC layer is finished, the liquid crystal display panel according to the embodiment of the invention can be put into use.

When the liquid crystal display panel according to the embodiment of the invention is powered off, the first transparent electrode unit, the second transparent electrode unit and the third transparent electrode unit are all not applied with voltages, the positive liquid crystal molecules are arranged perpendicular to the substrates due to the initialization process, light is not refracted or reflected after it enters into the PDLC layer, and in this case, the light is transmitted directly.

Figure 3:
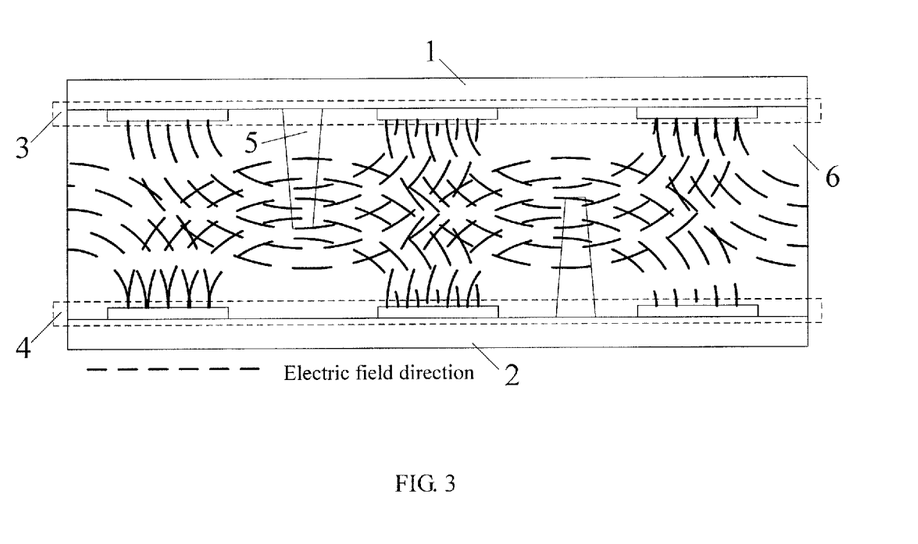

When the liquid crystal display panel according to the embodiment of the invention is powered on, the second transparent electrode unit is applied with the first voltage, the third transparent electrode unit is applied with the second voltage with the polarity opposite to that of the first voltage, the first transparent electrode unit is controlled by the switch element to have the polarity same as that of the first voltage, so that the first transparent electrode unit and the second transparent electrode unit have the polarity opposite to that of the third transparent electrode unit and the electric field as shown in FIG. 3 is formed. As shown in FIG. 3, the directions of the electric field are relatively disordered and the liquid crystal molecules are arranged along the directions of the electric field, and thus the liquid crystal molecules of the PDLC layer are in a random state. Accordingly, the light is refracted and reflected on the interface of the liquid crystal molecules and the polymer matrix after it enters into the PDLC layer and the PDLC layer presents a milky scattering state.

In the liquid crystal display panel according to the embodiment of the invention, a trans-PDLC layer can be obtained with the positive liquid crystal by designing and arranging the first transparent electrode unit, the second transparent electrode unit and the third transparent electrode unit. Because the physical property of the positive liquid crystal is superior to that of the negative liquid crystal, compared with the case that the trans-PDLC layer is fabricated with the negative liquid crystal in the conventional technology, the liquid crystal display panel according to the embodiment of the invention can reduce the driving voltage of the trans-PDLC layer, enhance the contrast ratio of the trans-PDLC layer and greatly improve electro-optical property of the trans-PDLC layer.

The foregoing embodiments merely are exemplary embodiments of the invention, and not intended to define the scope of the invention, and the scope of the invention is determined by the appended claims.

What is claimed is:

1. A liquid crystal display panel, comprising a first substrate and a second substrate opposite to each other, and a polymer dispersed liquid crystal (PDLC) layer disposed between the first substrate and the second substrate, wherein
the PDLC layer is formed by polymerizing a positive liquid crystal and a polymer matrix, and the positive liquid crystal is initialized to be perpendicular to the substrates; and
the liquid crystal display panel further comprises:
a first transparent electrode unit, disposed on a surface of the first substrate facing the second substrate and connected with a switch element;
a second transparent electrode unit, disposed on a surface of the second substrate facing the first substrate and connected with a first voltage, wherein the second transparent electrode unit is insulated from the first transparent electrode unit; and
a third transparent electrode unit, disposed on the first substrate and the second substrate, the third transparent electrode unit comprises a plurality of third transparent electrodes, each of the third transparent electrodes has a preset height and is connected with a second voltage, the second voltage has a polarity opposite to that of the first voltage, and the third transparent electrode unit is insulated from the first transparent electrode unit and the second transparent electrode unit,
wherein the first transparent electrode unit comprises a plurality of first transparent electrodes arranged on the first substrate at intervals, and the second transparent electrode unit comprises a plurality of second transparent electrodes arranged on the second substrate at intervals, the second transparent electrodes and the first transparent electrodes are arranged opposite to each other one by one,
wherein the third transparent electrode unit comprises the plurality of third transparent electrodes disposed on the first substrate and the second substrate in an alternate manner, each third transparent electrode on the first substrate is disposed between adjacent first transparent electrodes, and each third transparent electrode on the second substrate is disposed between adjacent second transparent electrodes,
wherein the third transparent electrodes disposed on the first substrate and the third transparent electrodes disposed on the second substrate are not opposite to each other.

2. The liquid crystal display panel according to claim 1, wherein each of the third transparent electrodes is higher than each of the first transparent electrodes and each of the second transparent electrodes.

3. The liquid crystal display panel according to claim 1, wherein the height of each third transparent electrode is of $1/2\,D < h < D$, where D is a thickness of the PDLC layer, and h is the height of each third transparent electrode.

4. The liquid crystal display panel according to claim 1, wherein the third transparent electrode is of cylinder-shape, hill-shape or wedge-shape.

5. The liquid crystal display panel according to claim 1, wherein the liquid crystal display panel further comprises:
a first alignment layer disposed between the PDLC layer and the first transparent electrode unit;
a second alignment layer disposed between the PDLC layer and the second transparent electrode unit.

6. A display device, comprising a liquid crystal display panel according to claim 1.

7. A driving method of a liquid crystal display panel according to claim 1, wherein the method comprises:
when the liquid crystal display panel is powered on, the second transparent electrode unit is applied with the first voltage, the third transparent electrode unit is applied with the second voltage with the polarity opposite to that of the first voltage, the first transparent electrode unit is controlled by the switch element to have a polarity same as that of the first voltage, so that the first transparent electrode unit and the second transparent electrode unit have the polarity opposite to that of the third transparent electrode unit.

8. A fabrication method of a liquid crystal display panel, comprising:
    forming a first transparent electrode unit connected with a switch element on a first substrate;
    forming a second transparent electrode unit connected with a first voltage on a second substrate, wherein the second transparent electrode unit is insulated from the first transparent electrode unit;
    forming a third transparent electrode unit connected with a second voltage on a surface of the first substrate where the first transparent electrode unit is disposed and on a surface of the second substrate where the second transparent electrode unit is disposed, wherein the third transparent electrode unit comprises a plurality of third transparent electrodes, each of the third transparent electrodes has a preset height, the third transparent electrode unit is insulated from the first transparent electrode unit and the second transparent electrode unit, and the second voltage has a polarity opposite to that of the first voltage;
    arranging the surface of the first substrate where the first transparent electrode unit is disposed to be opposite to the surface of the second substrate where the second transparent electrode unit is disposed; and
    filling a PDLC layer formed by polymerizing a positive liquid crystal and a polymer matrix between the first substrate and the second substrate, and initializing the PDLC layer so that the positive liquid crystal is arranged perpendicular to the substrates,
    wherein the forming a first transparent electrode unit connected with a switch element on a first substrate and forming a second transparent electrode unit connected with a first voltage on a second substrate comprise:
    forming a plurality of first transparent electrodes arranged on the first substrate at intervals, and forming a plurality of second transparent electrodes arranged on the second substrate at intervals,
    wherein the second transparent electrodes and the first transparent electrodes are arranged opposite to each other one by one,
    wherein the forming a third transparent electrode unit connected with the second voltage on the first substrate and on the second substrate comprises:
    forming the plurality of third transparent electrodes on the first substrate and the second substrate in an alternate manner, disposing each third transparent electrode on the first substrate between adjacent first transparent electrodes, and disposing each third transparent electrode on the second substrate between adjacent second transparent electrodes,
    wherein the third transparent electrodes disposed on the first substrate and the third transparent electrodes disposed on the second substrate are not opposite to each other.

9. The fabrication method of the liquid crystal display panel according to claim 8, wherein the forming the plurality of third transparent electrodes on the first substrate and the second substrate in an alternate manner comprises:
    forming the third transparent electrodes by overlapping a plurality of transparent conductive layers with a printing process, or
    forming the third transparent electrodes by firstly forming transparent insulation structures with a transparent insulation material and then coating a transparent conductive layer on the transparent insulation structures.

10. The fabrication method of the liquid crystal display panel according to claim 8, wherein the initializing the PDLC layer so that the positive liquid crystal is arranged perpendicular to the substrate comprises:
    during forming the PDLC layer, the second transparent electrode unit is applied with the first voltage and the first transparent electrode unit is controlled by the switch element to have a polarity opposite to that of the second transparent electrode unit, so that an electric field perpendicular to the substrates is formed between the first transparent electrode unit and the second transparent electrode unit and liquid crystal molecules of the PDLC layer are arranged perpendicular to the substrates, and at the same time, the PDLC layer is cured; or
    after forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form a first alignment layer of vertical alignment and a second alignment layer of vertical alignment.

11. The fabrication method of the liquid crystal display panel according to claim 8, wherein the initializing the PDLC layer so that the positive liquid crystal is arranged perpendicular to the substrate comprises:
    during forming the PDLC layer, the second transparent electrode unit is applied with the first voltage and the first transparent electrode unit is controlled by the switch element to have a polarity opposite to that of the second transparent electrode unit, so that an electric field perpendicular to the substrates is formed between the first transparent electrode unit and the second transparent electrode unit and liquid crystal molecules of the PDLC layer are arranged perpendicular to the substrates, and at the same time, the PDLC layer is cured; and
    after forming the first transparent electrode unit and the second transparent electrode unit, alignment material of vertical alignment is coated on the surface of the first substrate where the first transparent electrode unit is disposed and on the surface of the second substrate where the second transparent electrode unit is disposed, and the alignment material is cured to form a first alignment layer of vertical alignment and a second alignment layer of vertical alignment.

* * * * *